United States Patent
Woodall et al.

(10) Patent No.: US 7,035,996 B2
(45) Date of Patent: Apr. 25, 2006

(54) GENERATING DATA TYPE TOKEN VALUE ERROR IN STREAM COMPUTER

(75) Inventors: Thomas R. Woodall, Valencia, CA (US); Mark C. Hama, Rolling Hills Estates, CA (US)

(73) Assignee: Raytheon Company, Waltham, MA (US)

( * ) Notice: Subject to any disclaimer, the term of this patent is extended or adjusted under 35 U.S.C. 154(b) by 185 days.

(21) Appl. No.: 10/644,449

(22) Filed: Aug. 19, 2003

(65) Prior Publication Data

US 2004/0039894 A1 Feb. 26, 2004

Related U.S. Application Data

(63) Continuation-in-part of application No. 10/630,891, filed on Jul. 30, 2003, and a continuation-in-part of application No. 10/052,082, filed on Jan. 17, 2002, now Pat. No. 6,920,545.

(51) Int. Cl.
*G06F 15/82* (2006.01)
(52) U.S. Cl. ..................................... 712/25; 712/201
(58) Field of Classification Search ................. 712/25, 712/26, 201, 221
See application file for complete search history.

(56) References Cited

U.S. PATENT DOCUMENTS

| | | | | |
|---|---|---|---|---|
| 5,241,635 A | * | 8/1993 | Papadopoulos et al. | 712/201 |
| 5,327,569 A | * | 7/1994 | Shima et al. | 712/26 |
| 5,341,506 A | * | 8/1994 | Nohmi et al. | 712/26 |
| 5,452,464 A | * | 9/1995 | Nomura et al. | 712/201 |

* cited by examiner

Primary Examiner—Kenneth S. Kim
(74) Attorney, Agent, or Firm—Leonard A. Alkov; Karl A. Vick

(57) ABSTRACT

A stream computer comprises a plurality of interconnected functional units. The functional units are responsive to a data-stream containing data and tokens. The data is to be operated on by one or more of the plurality of interconnected functional units.

Digital logic cooperatively associated with one of the functional units adds one or more tokens to the data stream presented to one of the functional units. The tokens are representative of the type of data being generated or received by the functional units. The digital logic also reports the occurrence of said one or more tokens within said data stream without interrupting the data stream.

The digital logic reports one or more tokens arriving at one of the functional units as part of the data stream to a graphical programming environment. The graphical programming environment is compatible with human perception. The programming environment compares tokens arriving from the digital logic with stored values within the graphical environment for the tokens so as to identify any errors. An error message is generated by the graphical programming environment whenever the comparison between the tokens and the stored values within the programming environment indicates that the tokens and the stored values do not match. These tokens are reported by the digital logic to a graphical programming environment compatible with human perception.

9 Claims, 8 Drawing Sheets

| TYPICAL TOKEN (HEX) | TYPICAL DATA 3 x 64 bits |
|---|---|
| F0 | Signed Integer |
| F1 | Unsigned Integer |
| F2 | Fixed point |
| F3 | Floating point |
| F4 | ASCII text |
| F5 | Other |
| etc. | |

FIG 7

GENERATING DATA TYPE TOKEN VALUE ERROR IN STREAM COMPUTER

This application is a continuation in part of U.S. Patent and Trademark Office application Ser. No. 10/052,082 titled "Reconfigurable Processor Architectures", filed Jan. 17, 2002, now U.S. Pat. No. 6,920,545 as well as application Ser. No. 10/630,891 titled "Defining Breakpoints and Viewpoints in the Software Development Environment for Programmable Stream Computers", filed Jul. 30, 2003.

BACKGROUND OF THE INVENTION

1. Field of Invention

This invention is in the field of tokens for use in stream computers.

2. Description of the Related Art

One aspect of computer operation is control of data flow and instructions within the computer. The data to be used in arriving at a result using the computer, as well as the instructions for using the data, are organized in a particular order suitable for the problem to be solved as well as the structure of the computer. Thus, data/instruction flow mechanism is critical to the efficient operation and enhanced utility of a particular computer.

In prior art, Von Newman type, central control computers, data flow control is achieved by placing data in a first memory location and instructions pertinent to computations involving the data in a second memory location. Control of the execution of computer instructions is performed by extracting data from the first memory location and operating on the data in accordance with instructions located in the second memory location. The sequence of the read/compute/write events are defined with the aid of a software tool, such as a compiler, having the capability of allocating specific items of data and instructions to specific contents of registers or memory locations within the computer.

Prior art software tools allowing the step by step examination allocation of registers and memory location to data and instructions for flow control in Von Newman architecture computers are well known. However, with the advent of distributed, stream computers described in the parent application, the software tools relevant in single central processing unit (CPU) Von Newman architectures are no longer applicable, in fact, impossible to use. The prior art tools depend on a central entity, the central processing unit to control the flow of information between memory locations within a computer. Thus, this one central entity, is responsible for program progress and is the area to be monitored. In this invention, in contrast, there are pluralities of independent processing entities, each having separate memory and computational capabilities, having no relationship to the Von Newman structure, function or concept.

SUMMARY OF THE INVENTION

Above limitations are solved by the present invention by a stream computer, said stream computer comprising a plurality of interconnected functional units. The functional units are responsive to a data stream containing data and tokens. The data is to be operated on by one or more of said plurality of interconnected functional units.

Digital logic cooperatively associated with one of said functional units adds one or more tokens to the data stream presented to one of said functional units. The tokens are representative of the type of data being generated by the functional units. The digital logic also reports the occurrence of said one or more tokens within said data stream without interrupting the data stream.

The digital logic reports one or more tokens arriving at one of the functional units as part of the data stream, or being generated by a functional unit, to a graphical programming environment. The graphical programming environment is compatible with human perception. The programming environment compares said one or more tokens arriving from the digital logic with stored values for said one or more tokens so as to identify any possible errors. An error message is generated by the graphical programming environment whenever the comparison between said one or more tokens and said stored values within the programming environment indicates said one or more tokens and said stored values do not match, indicative of a programming error.

At least one of the plurality of interconnected functional units, and the digital logic, are integrated on a single substrate.

BRIEF DESCRIPTION OF THE DRAWING

In the Drawing:

FIG. 7 shows examples of token types to be used with stream computers applicable to this invention.

DETAILED DESCRIPTION

The present invention describes an apparatus and method of using tokens in the programming of a stream computer.

The stream computer comprises a first plurality of interconnected functional units. The functional units are responsive to a data stream containing data and tokens. The data is to be operated on by one or more of said interconnected functional units. The data stream may or may no change as it traverses a functional unit.

Stream computers are collections of functional units (nodes) operationally interconnected via software data/token streams in addition to hardware links. More specifically, stream computers comprise a plurality of similar functional units where the specification of the computer (and the programming thereof) is defined by the operations performed by the functional units and the streams (also known as data flows) that connect, or traverse the functional units. Thus, the specification of a computer program for stream computers is defined by the operations performed by the functional units and the streams (also known as data flows) that connect the functional units.

The functional units perform prescribed operations on the input(s) and create output(s) when all inputs are valid and the output flow can accept the output. The software streams flowing between functional units contain data, for example, integer data. Some stream computers also have control/token information as part of the data, generally at most a few bits, or a small percentage of the data bits. This control/token information also flows along with the data between functional units. The token information is not operated on (e.g. added, multiplied) but rather is used to determine how the computational capabilities of the functional unit are to be performed on the data portion present in the data stream.

Figure 1:
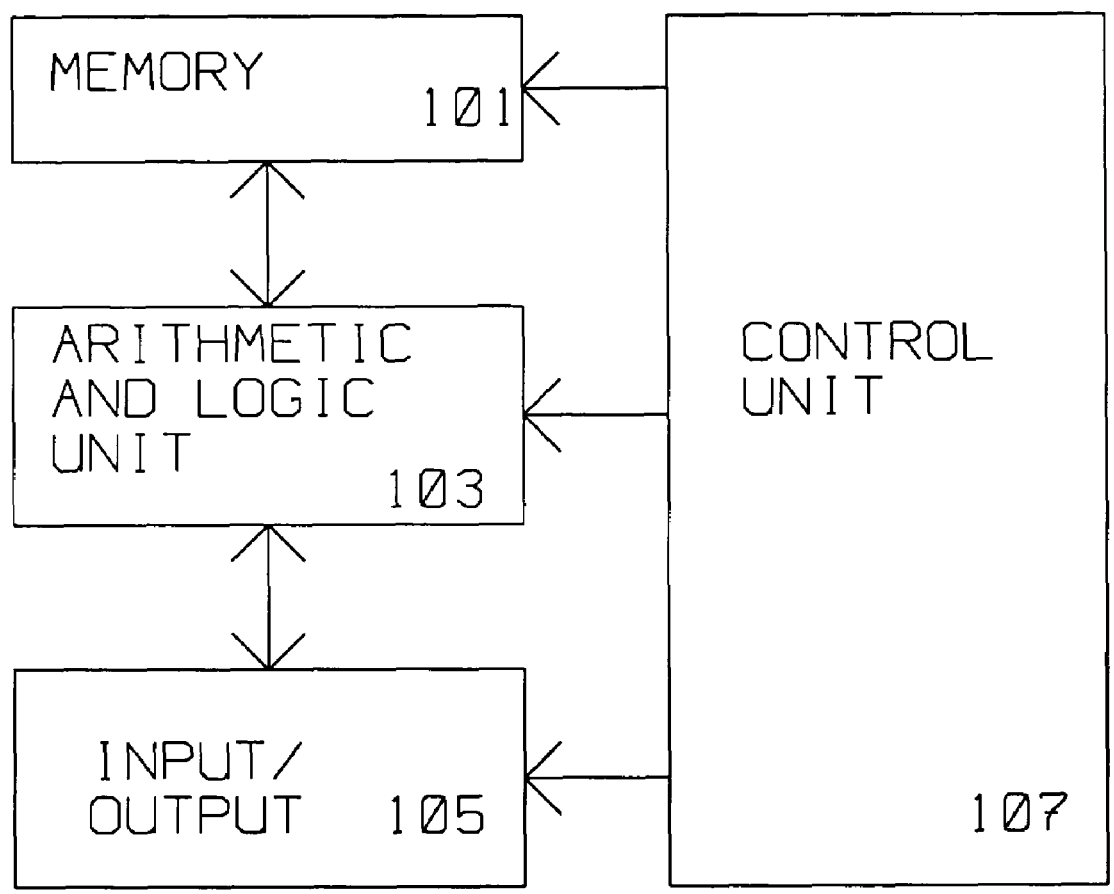
FIG. 1 is an exemplary configuration of prior art Von Newman, central control computer architecture.

In contrast to stream computers, FIG. 1 is an exemplary Von Newman computer structure of the prior art. A control unit 107 monitors the transfer of digital information between memory 101, Arithmetic and Logic Unit (ALU) 103, and Input/Output unit 105. Typically, control unit 107 will instruct ALU 103 to fetch contents of a particular location within memory 101, perform a mathematical or logical operation on the retrieved data, then write the results at another location within memory 101. Control unit 107 can interpret an instruction retrieved from memory 101 and select alternative courses of action based on the results of previous operations. Memory 101 contains both data and instructions to be followed by control unit 107 and/or ALU 103. The instructions can be followed in any order. Similarly, control unit 107 will instruct Input/Output (I/O) unit 105 to make ready data for ALU 103 to read. Thus, for software development purposes, monitoring control unit 107, contents of memory 101 and I/O 105 will suffice to ascertain the state of the computer on a step by step basis and monitor progress of program execution. Compilers of the prior art provide break points within a sequence of executed steps by control unit 107. The break points typically halt the execution of program steps within control unit 107 and list contents of certain locations within memory 101 for inspection and reconciliation with expected values. In Von Newman architectures, there is no flow of data to a plurality of functional units, each capable of computing the required results. Von Newman architectures can be viewed as having centralized control, while stream computers represent a distributed structure with much duplication of individual functional units where each functional unit reacts independently of the others and computes results under control of flowing data and tokens.

To accommodate the distributed nature of stream computers, and facilitate software development for them, this invention defines the specification of token information to be part of the definition (or program) of a stream computer. This functionality is best implemented in a graphical programming environment and the examples illustrating the best mode of the invention use such an environment. This invention applies type specification techniques to token information and provides for type specification as well as type checking within the graphical programming environment.

The examples in this invention are illustrated by the use of a simple polynomial equation to illustrate the characteristics of this invention. The general illustrative equation used is $Y=PX^2+QX+R$ where P, Q, R and X are inputs and Y is the output. For simplicity, X and Y are the only dynamic data streams and P, Q, and R are constants (i.e. registers preloaded with constant values) whereas a new value of X is potentially available on the input stream for every clock pulse.

Figure 2:
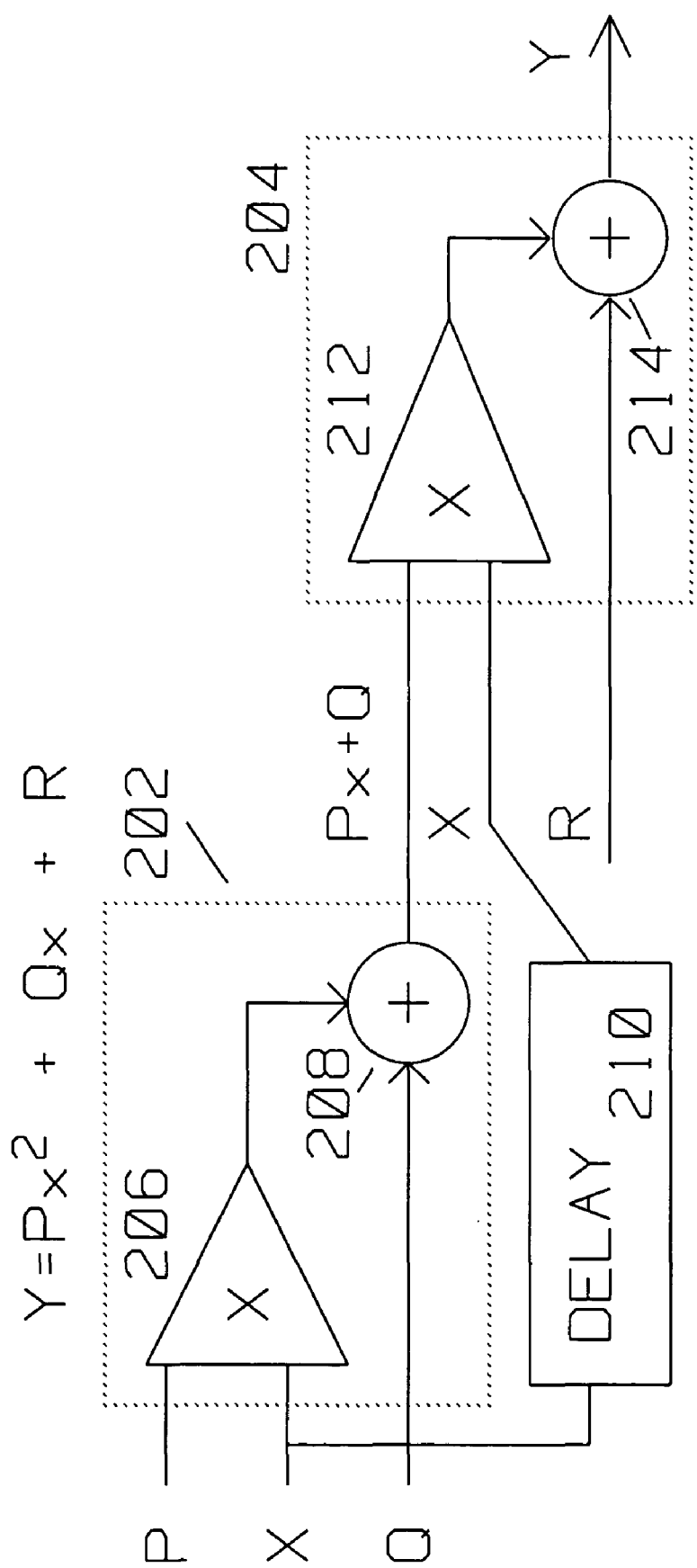
FIG. 2 is an exemplary graphic representation of a problem to be solved using stream computers.

As shown in FIG. 2, in this example, the fundamental (primitive) functional unit in the sample computer is a multiply-arithmetic unit 202 capable of performing a multiplication in multiplier 206 and an addition in adder 208. The results from multiplier 206 are combined with an addition in adder 208. While this example shows a multiplier 206 and adder 208, any other functions can be substituted, depending on computational needs.

Functional unit 202 is shown by the dashed line and in later figures will be identified as a MUL. Functional unit 204 is structurally similar to functional unit 202, having a multiplier 212 and adder 214 to generate an output Y.

Delay 210 applied to X matches the delay experienced in functional unit 202. Without delay 210, X would be presented to functional unit 204 before the result from functional unit 202, PX+Q, was ready. This delay facilitates keeping the pipeline full.

From the diagram in FIG. 2, the output Y is the result of $PX^2+QX+R$, as computed by functional units 202 and 204.

Figure 3:
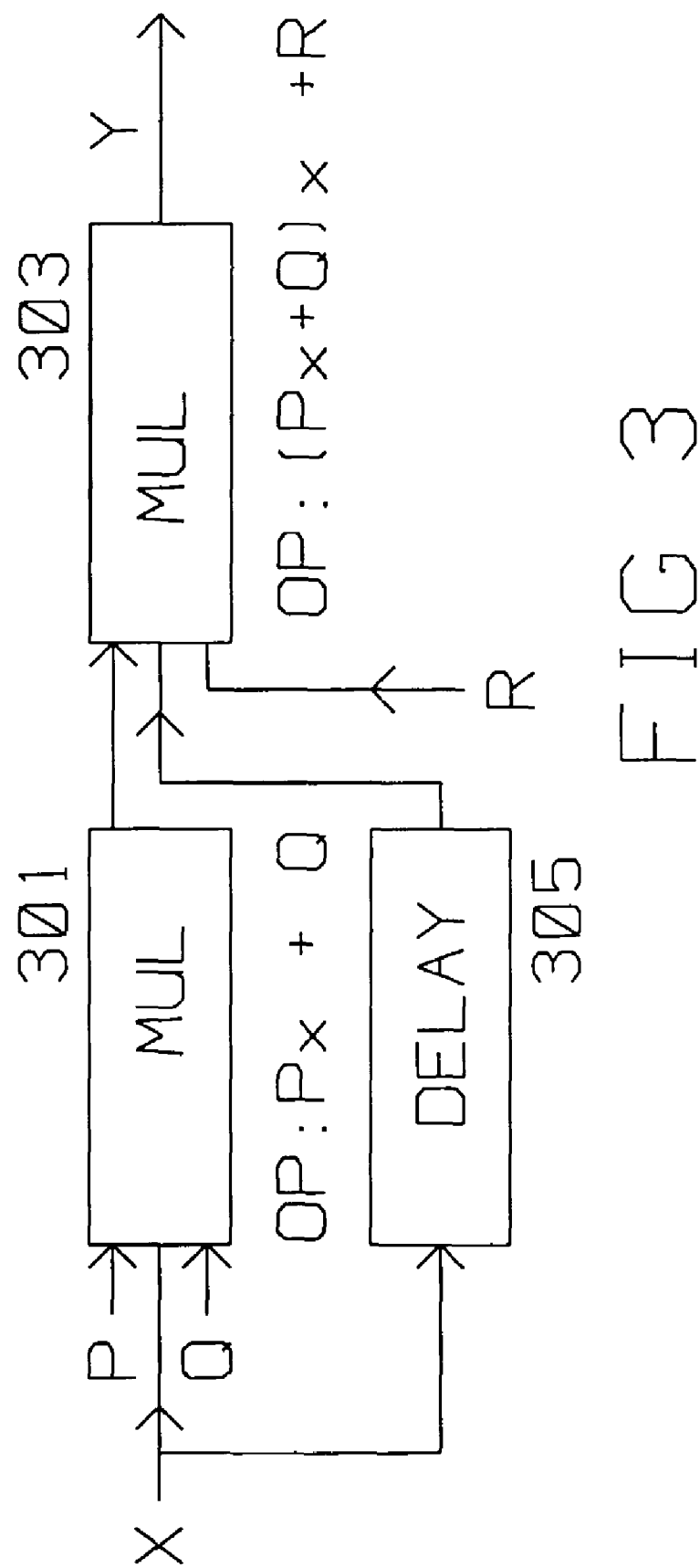
FIG. 3 is an exemplary user defined function of the problem in FIG. 2 via a graphical interface.

In a graphical programming environment to be used with this invention, the user graphically represents the function being performed within the stream computer. In this example, as shown in FIG. 3, a user defined function for the same equation as in FIG. 2 $Y=PX^2+QX+R$ is being defined. In the graphical interface, MUL 301 is the hardware functional unit 202, while MUL 303 is the hardware functional unit 303. The delay 305 for X is also provided to facilitate the operation of the pipeline.

In the graphical interface of this invention, for this example, the user selects each data flow and selects the data types. The user also selects the function and specifies the function to be performed by MUL 301 and MUL 303. In this case, the function of MUL 301 and MUL 303 is a multiply with an add.

The input streams X and output Y are typed, that is, they contain both data and token information. The token(s) contain(s) information as to the type the data is, e.g. signed integer, unsigned integer, floating point, ASCII etc. The token information is optional. The development environment checks type compatibility as various elements forming the stream computer are assembled. In other words, an error message is generated by the graphical programming environment whenever the comparison between the type of an arriving token does not match the type of token expected. The expected token is stored within a functional unit for immediate reference and comparison to arriving tokens.

For example, in FIG. 3, the data entering MUL 301 is checked for compatibility with MUL 301. If for example data X were typed as "ASCII TEXT", it would be incompatible with MUL 301.

Within the programming environment, each data stream and/or data item can be annotated with comments. These comments can be hidden or unhidden depending on the needs of the programmer.

Figure 4:
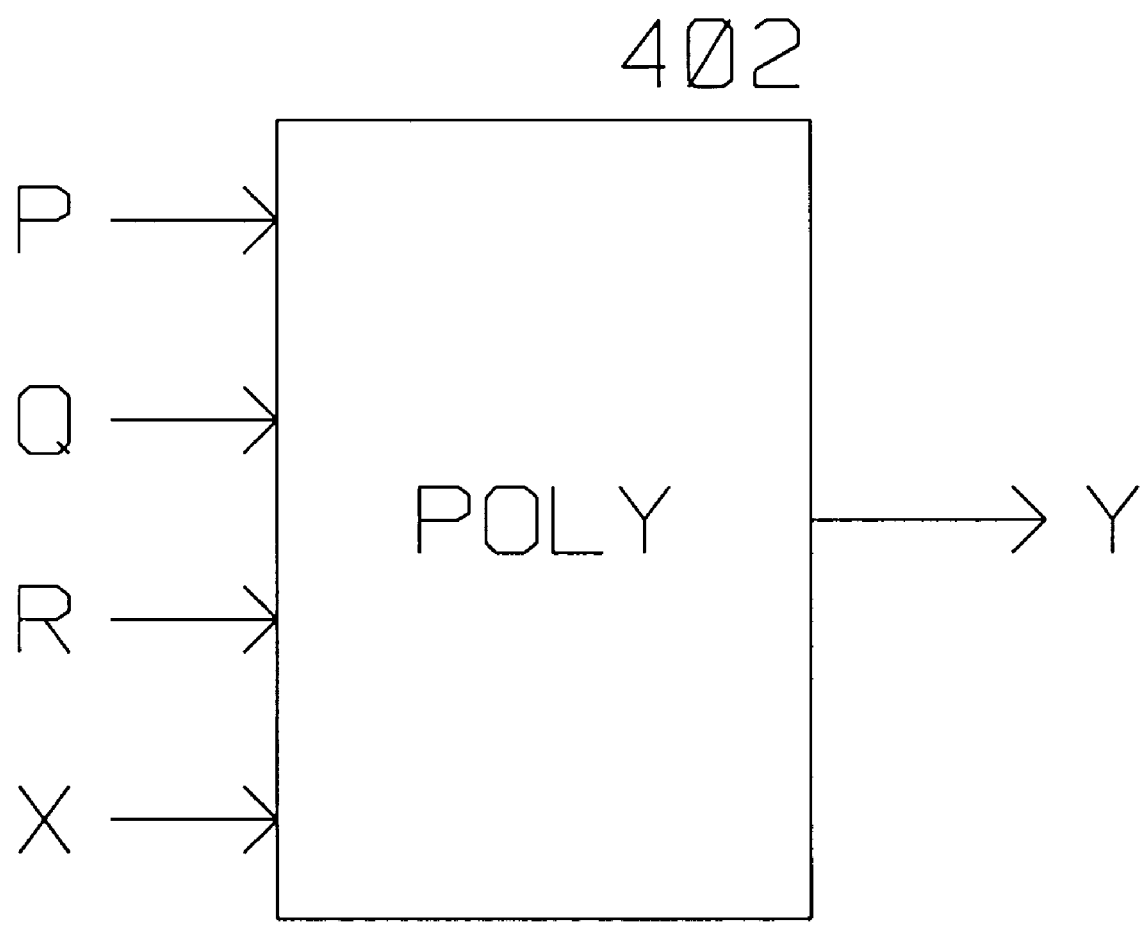
FIG. 4 is a user defined function POLY, synthesized from other functions.

MUL 301 and MUL 303 can be grouped to show a complete operation, in this case $Y=Px^2+Qx+R$, and represented as a single function, POLY, as shown in FIG. 4.

Typically, having completed the specification of the functional units, the specification will be executed on a simulator or directly in hardware. The graphical representation shown in FIG. 4, is an example of the structure of FIG. 3. The graphical representation is compiled to generate an executable program. The executable to compute $Y=2X^2+3X+4$ is then run on a target computer or simulator. The details of compilation of a specification, and running the compilation on a target (whether real hardware or a simulation) are well known, and therefore not detailed further.

Token Type Specification in a Graphical Environment

In a graphical programming environment of this invention, the user graphically represents the function being performed. In FIG. 3 a user defined function is shown. The user selects each flow and selects the data types. The user also selects the function and specifies the function to be performed.

In the example of FIG. 3 the function of each MUL is a multiply with an add. The programming environment checks data type compatibility as indicated by a token type. The user also specifies the token type expected by the function as an input and the token type created by the function as an output. The output and input tokens may be different, depending on the function present between the input and output.

The graphical programming environment allows for predefined and user specified definitions. Furthermore, if the function performed is not dependent on the token, the environment interprets this condition, and marks the input token type as a "don't care" type. The output will always have a token type because it is always generating these values. In this example, X is the only stream input and Y the only stream output. Therefore, only X and Y inherit the token originally types specified.

There is also an internal stream between the MUL 301 and MUL 303 functions. The programming environment verifies that the output token type of MUL 301 is the same as the input to MUL 303.

As shown in FIG. 4, the function defined in FIG. 3, is referenced in the programming environment as POLY 402. Once defined as POLY, the complete function POLY 402 can be used as a defined function by simple drag and drop methods.

Type Checking

Figure 5:
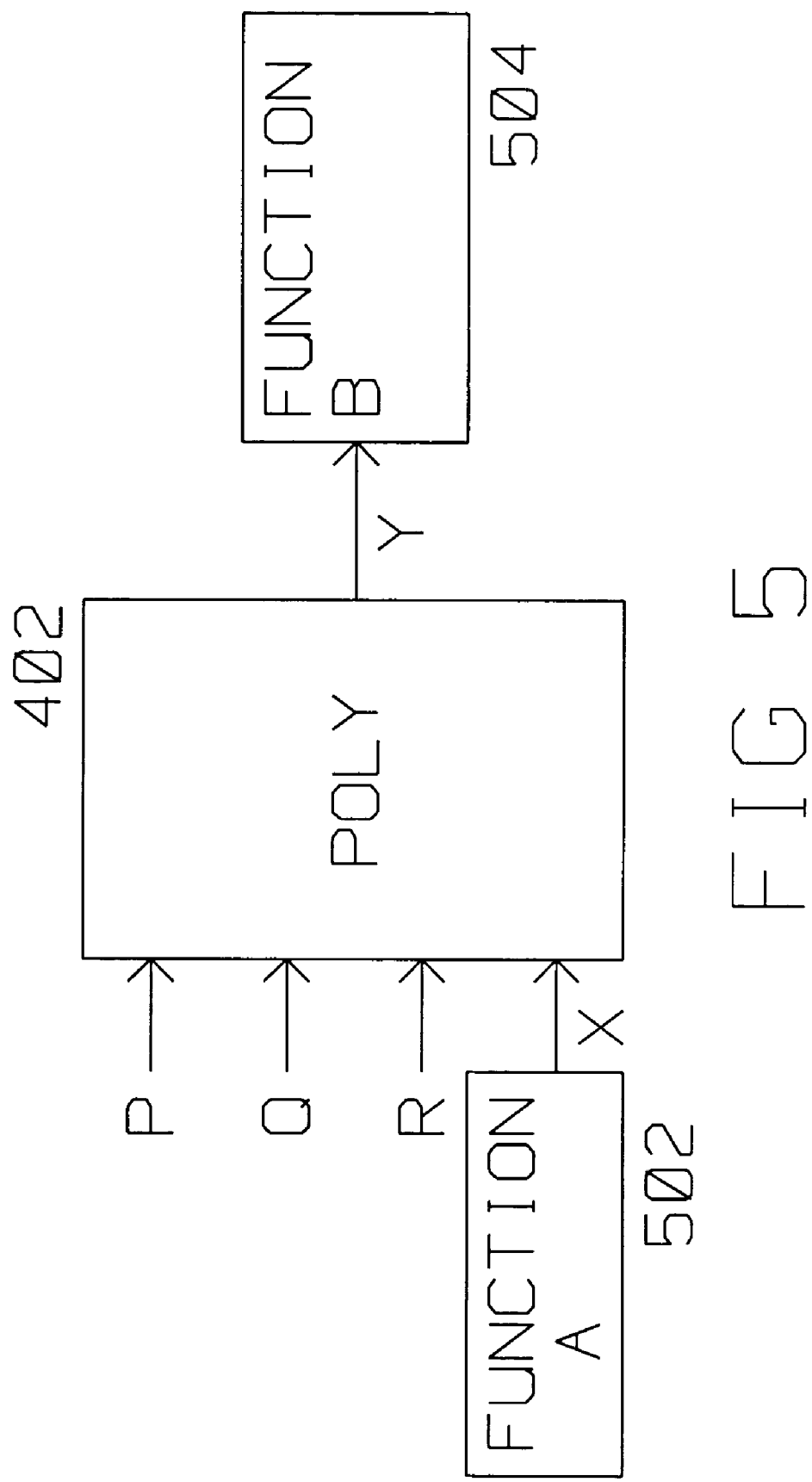
FIG. 5 shows a typical graphical environment depiction of functions used in conjunction with the function defined in FIG. 4.

The function call POLY 402 of FIG. 4 can be used to build up a larger function, as shown in FIG. 5. In this example, the X input to POLY is connected to the output of Function A 502. When this is done, the graphical programming environment checks the data type and token type at the input for POLY 402 for compatibility with Function A 502. Furthermore, the output from POLY 402 is also checked for compatibility. For example, if the input token type for POLY 402 was "don't care" then it would always be compatible with whatever token type Function A 502 generated. However, if the input from Function A 502 was ASCII text, then it would be incompatible with POLY 402, since POLY 402, in this example, operates on numeric variables such as floating point, not text. Type incompatibilities are highlighted within the programming environment to preclude inconsistent computations by the stream computer.

When the output of POLY 402 is connected to Function B 504, then once again the programming environment checks for data and token type compatibility between the output of POLY 402 and Function B 504.

Figure 6:
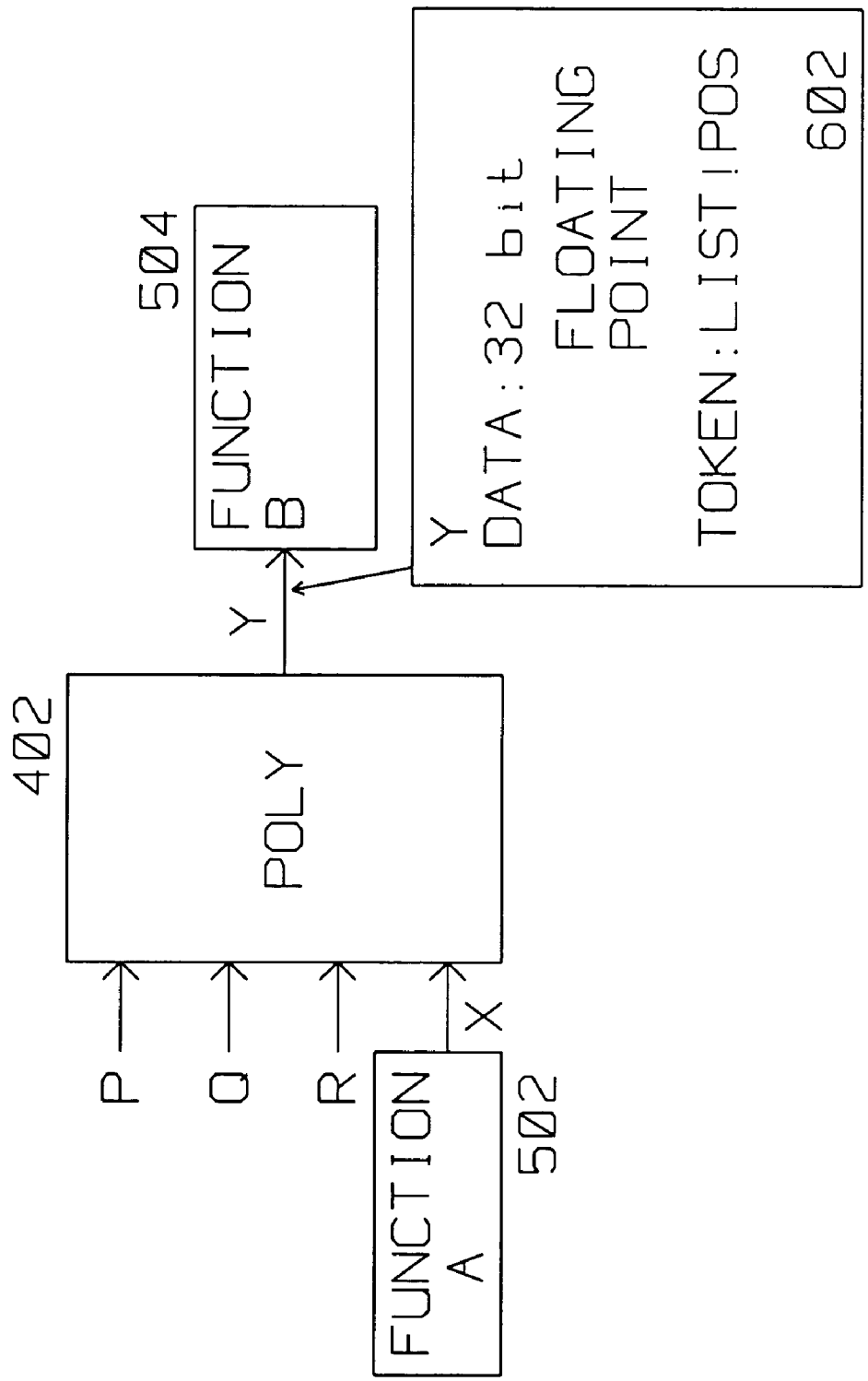
FIG. 6 shows further details of the display from the graphical environment applied to a variable generated from the exemplary stream computer described herein.

The graphical environment permits a user to display/hide as much information as desired. Therefore the user selects a data stream using a pointing device and, in response, the graphical environment shows the information relating to it. The example in FIG. 6 shows that Y is a 32 bit floating point data stream and than the token type is List!Pos. List!Pos is a user defined token type that in this case represents the order of the value in a list of values, for example, "first", "middle", "last", "only". The "only" case means the data identified as such would be the first and last value in the list. This type of token type illustrates how tokens are used. For example, if Function B performs some type of multiply or accumulation, it may need to treat the first and last cases differently. For example, if the Function B is going to produce an output that includes multiplying successive values of the Y input stream (e.g. $Y_1 \cdot Y_2 \cdot \ldots Y_n$) then the first value of Y (produced by POLY 402) has a token value of "first". That may cause Function B 504 not to perform internally a multiply (or it may be to multiply Y by 1). When the token value has a value of "last" it causes Function B 504 to produce an output and clear internally accumulated values.

The current state of the art (either in programming languages or graphical environment) does not allow for the specification of token types. As can be seen, if POLY 402 and Function B 504 are not in agreement as to the representation of the token values (as defined by the token type) then the overall function performed by the system may not be as anticipated.

FIG. 6 further shows the image from the graphical environment detailing an example of data flow from POLY 402 to Function B 504. The detail is in window 603 and identifies the data as being 32 bit, floating point and the token as LIST!POS, that is, part of a list.

Programming Language and Compiler

What has been shown as a graphical programming environment can also be done via ASCII, textual representation. In an ASCII programming environment the type checks would be based on names and the checks would be performed at time of program compilation, rather than during the specification phase in the graphical environment.

FIG. 7 shows examples of typical tokens to be added to, or present within the data stream designating the type of data at a particular location within a stream computer. Examples of tokens are Signed Integer, Unsigned Integer, Fixed Point Floating Point ASCII text Other (such as Order of the value in a list of values, for example, "first", "middle", "last", "only").

Inputs to a functional unit of a particular type are consumed, while outputs from a functional unit of the same or different type are produced. Functional units (nodes) only produce if the previous output sent to the functional units is consumed. The next destination of the data—token combination within the data stream is determined by programming of the switches with the stream computer. The token portion does not specify the operation to be performed by the data, as that is specified by the programming of the switches and routing to particular functional units. The token specifies how a particular operation already pre-programmed in the functional unit is to be performed within that functional unit.

By convention, each output stream contains a token to be sent to the next functional unit to handle the output stream. Use of the token by the receiving functional unit is optional, however it typically is used.

While the example given in FIG. 7 uses hex notation for the tokens, typically, in current implementations, the tokens are 2 or 3 bits in length. Tokens can be viewed as an overhead to the computing operation and therefore are best kept short so as to minimize the overhead. However, it is envisioned that as the number of tokens increases, the number of bits required to distinguish them will also increase.

Stream Computer using Tokens.

Figure 8:
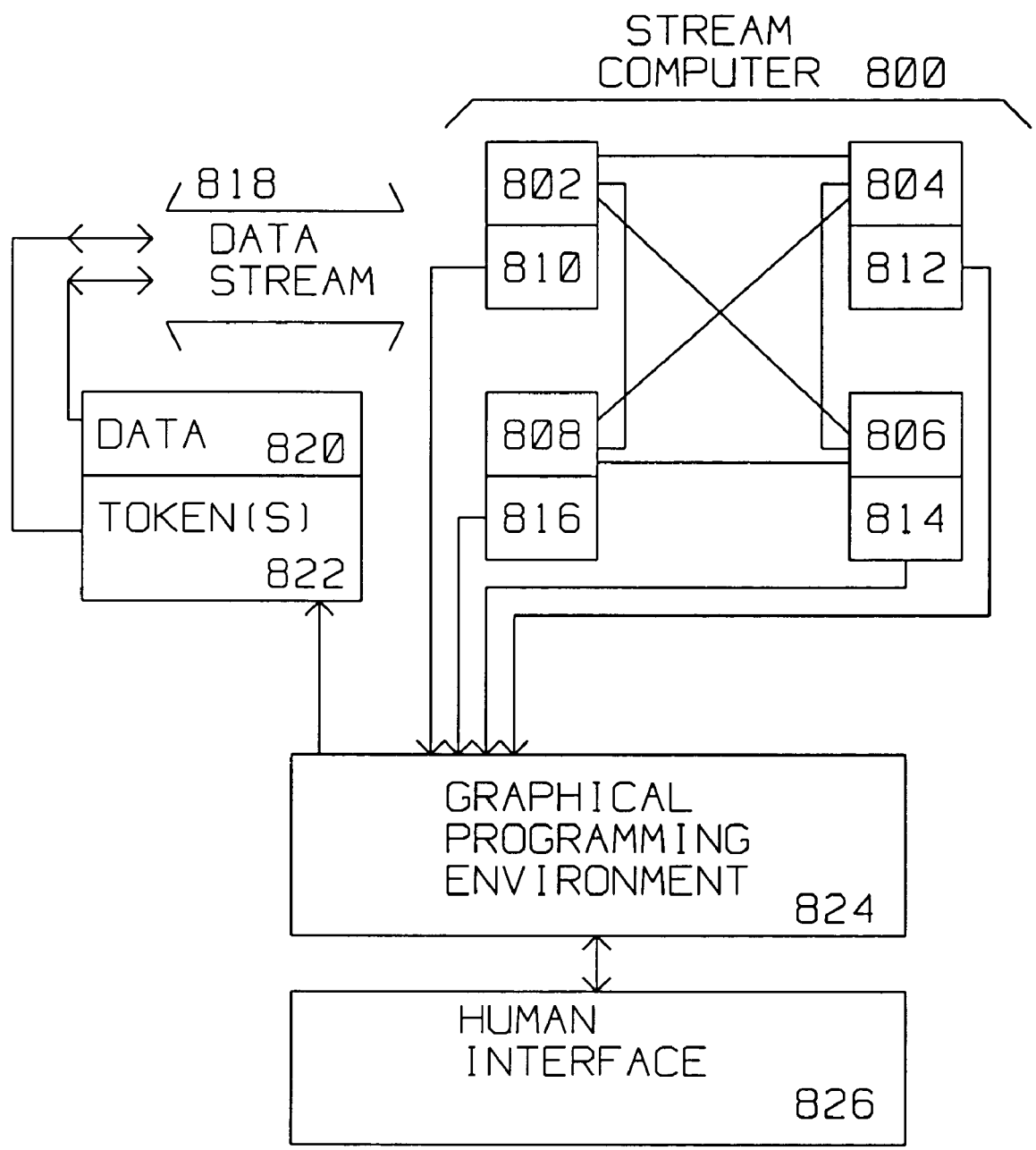
FIG. 8 shows a stream computer of this invention using tokens in the data stream.

Using above details, and shown in FIG. 8, the present invention is of a stream computer 800, said stream computer 800 comprising a plurality of interconnected functional units 802, 804, 806 and 808. This exemplary computer has only four functional units, however, normally the number of functional units may reach into the hundreds. The functional units are responsive to a data stream 818 containing data 820 and tokens 822. The data 820 is to be operated on, or computed, by one or more of said plurality of interconnected functional units.

Digital logic 810, 812, 814, 816 cooperatively associated with said functional units 802, 804, 806 and 808 respectively adds one or more tokens to the data stream presented to one of said functional units. The tokens are representative of the type of data being generated by the functional units. The digital logic also reports the occurrence of said one or more tokens within said data stream to graphical programming environment 824 without interrupting the data stream.

The digital logic 810, 812, 814, and 816 reports one or more tokens arriving at one of the functional units as part of the data stream 818 to a graphical programming environment 824. The graphical programming environment 824 is compatible with human perception using human interface 826. The programming environment 824 compares tokens 822 arriving from the digital logic with stored values for the expected tokens 822 so as to identify any possible errors. An error message is generated by the graphical programming environment 824 using human interface 826 whenever the comparison between said one or more tokens and said stored values indicates said one or more tokens and said stored values do not match.

The digital logic 810, 812, 814 and 816 also reports tokens generated by one of the functional units 802, 804, 806 and 808, the one or more tokens incorporated within data stream 818 generated by said functional units. These tokens are reported by the digital logic to graphical programming environment 824 and made compatible with human perception by interface 826. Human interface 826 is typically a keyboard, a printer, a video output, a tele-type etc.

At least one of the plurality of interconnected functional units 802, 804, 806, or 808, and either digital logic 810, 812, 814 and 816 are integrated on a single substrate.

The method for operating the stream computer 800, comprises the steps of:

programming one or more interconnected functional units 802, 804, 860, 808 forming said stream computer 800 to respond to data 820 and one or more tokens 822, said data and said one or more tokens contained in a data stream 818;

programming digital logic 810, 812, 814, 816 cooperatively associated with the functional units for adding a token to said data stream presented to said one of said functional units, said token representative of the type of data being generated by said one or more functional unit.

The structure of the stream computer applicable herein is discussed in the parent applications. The parent application is incorporated herein in its entirety by reference.

Although presented in exemplary fashion employing specific embodiments, the disclosed structures are not intended to be so limited. For example, although a multiply and add function is shown as a building block example, any other combination of mathematical or Boolean logic operation could benefit from the tokens and associated concepts described by the invention herein.

Those skilled in the art will also appreciate that numerous changes and modifications could be made to the embodiment described herein without departing in any way from the invention. These changes and modifications and all obvious variations of the disclosed embodiment are intended to be embraced by the claims to the limits set by law.

The invention claimed is:

1. A stream computer, said stream computer comprising:

a plurality of interconnected functional units, each of said functional units responsive to a data stream containing data to be operated on by one or more of said functional units;

digital logic cooperatively associated with one of said functional units for adding one or more tokens to said data stream presented to said one of said functional units said one or more tokens used to describe a type of data being generated by said one or more functional units, said digital logic reporting said one or more tokens at one of said functional units to a graphical programming environment to generate an error message, said graphical programming environment compatible with human perception, wherein said data and one or more tokens form said data stream, said digital logic reporting the occurrence of said one or more tokens within said data stream to said graphical programming environment, wherein said digital logic reports one or more tokens arriving at one of said functional units, said one or more tokens within said data stream, said digital logic reporting to said graphical programming environment, said one or more tokens present within said data stream, said graphical programming environment compatible with human perception, wherein said programming environment compares said one or more tokens arriving from said digital logic with stored values for said one or more tokens to generate said error message, wherein an error message is generated by said graphical programming environment whenever said comparison between said one or more tokens and said stored values indicates said one or more tokens and said stored values do not match.

2. A stream computer as described in claim 1 wherein said digital logic reports said occurrence of tokens to said graphical programming environment without interrupting said data stream.

3. A stream computer as described in claim 1 wherein said digital logic reports one or more tokens generated by one of said functional units, said one or more tokens incorporated within said data stream, said digital logic reporting to a graphical programming environment, said one or more tokens present within said data stream, said graphical programming environment compatible with human perception.

4. A stream computer as described in claim 3 wherein said programming environment compares said tokens arriving from said digital logic with stored values for said tokens.

5. A stream computer as described in claim 1 wherein said at least one of said plurality of interconnected functional units, and said digital logic, are integrated on a single substrate.

6. A method for operating a stream computer, said method comprising the steps of:

programming one or more interconnected functional units forming said stream computer to respond to data and one or more tokens, said data and said one or more tokens contained in a data stream;

programming digital logic cooperatively associated with said one or more functional units for adding a token to said data stream presented to said one of said functional units, said token used to described a type of data being generated by said one or more functional units, said digital logic reporting said one or more tokens at one of said functional units to a graphical programming environment, said graphic programming environment compatible with human perception, wherein said digital logic reports the occurrence of tokens with said data stream to said graphical programming environment to generate an error message, where in said digital logic reports one or more tokens arriving at one of said functional units, said one or more tokens within said data stream, said digital logic reporting to said graphical programming environment, said graphical programming environment compatible with human perception of said one or more tokens present within said data stream, wherein said programming environment compares said tokens arriving from said digital logic with stored values for said one or more tokens to generate said error message, wherein an error message is generated whenever said comparison between said tokens and said stored values indicates said tokens and said stored values do not match.

7. A method for operating a stream computer as described in claim 6 wherein said digital logic reports said occurrence of tokens without interrupting said data stream to said graphical programming environment.

8. A method for operating a steam computer as described in claim 6 wherein said digital logic reports one or more tokens generated by one of said functional units, said one or more tokens generated by one of said functional units, said one or more tokens incorporated within said data steam, said digital logic reporting to a graphical programming environment, said graphical programming environment compatible with human perception of said one or more tokens present within said data stream.

9. A method for operating a stream computer as described in claim 8 wherein said programming environment compares said tokens arriving from said digital logic with stored values for said tokens.

* * * * *